April 30, 1968 J. M. ROBERTS 3,380,649
REACTOR PUMPING SYSTEM
Filed Oct. 19, 1965 7 Sheets-Sheet 1

INVENTOR.
John M. Roberts
BY
Charles &3 Curry

April 30, 1968  J. M. ROBERTS  3,380,649
REACTOR PUMPING SYSTEM
Filed Oct. 19, 1965  7 Sheets-Sheet 2

INVENTOR.
John M. Roberts
BY

INVENTOR.
John M. Roberts

INVENTOR.
John M. Roberts
BY Charles H. Curry

United States Patent Office 3,380,649
Patented Apr. 30, 1968

3,380,649
REACTOR PUMPING SYSTEM
John Martin Roberts, San Jose, Calif., assignor to General Electric Company, a corporation of New York
Filed Oct. 19, 1965, Ser. No. 497,787
4 Claims. (Cl. 230—102)

ABSTRACT OF THE DISCLOSURE

A feedwater driven jet pump system for circulating the coolant fluid in a nuclear reactor. The feedwater driving fluid and the driven coolant fluid are directed through a heat exchanger whereby the driving fluid cools the driven fluid to prevent it from flashing into steam at the pump inlet. Two jet pumps are arranged in series whereby each pump operates at a lower mass flow ratio to reduce sensitivity of flow rate to pressure variations across the reactor core.

---

The present invention relates broadly to fluid pumping systems and more particularly to an improved fluid pumping system for nuclear reactors and featuring a feedwater driven jet pumping system for pumping the recirculation fluid of the nuclear reactor.

The release of large amounts of energy through nuclear fission reactions is now quite well known. In general, a fissionable atom such as $U^{233}$, $U^{235}$, or $Pu^{239}$ absorbs a neutron in its nucleus and undergoes a nuclear disintegration. This produces on the average two fission products of lower atomic weight and great kinetic energy, and several fission neutrons also of high energy. For example, the fission of $U^{235}$ produces a light fission product and a heavy fission product with mass numbers ranging between 80 and 110 and between 125 and 155 respectively, and an average of 2.5 neutrons. The energy release approaches 200 mev. (million electron volts) per fission.

The kinetic energy of the fission products is quickly dissipated as heat in the nuclear fuel. If after this heat generation there is at least one net neutron remaining which induces a subsequent fission, the fission reaction becomes self-sustaining and the heat generation is continuous. The heat is removed by passing a coolant through heat exchange relationship with the fuel. The reaction may be continued as long as sufficient fissionable material exists in the fuel to override the effects of the fission products and other neutron absorbers which also may be present.

Jet pumps have been used for many years in a variety of applications where the simplicity, ruggedness, and lack of moving parts of the pump overcome its somewhat lower efficiency as compared to other type pumps. For example, jet pumps are commonly used as well pumps, air pumps, boiler feedwater injectors and steam vacuum ejectors. The first two examples represent uses in which the driven and the driving fluids are the same. In the third example, the driving fluid is steam while the driven fluid is water, whereas in the fourth example, the driving fluid is steam while the driven fluid is air or other gases.

Jet pumps are attractive for recirculating reactor coolant in boiling water reactors primarily because they may be positioned within the reactor vessel and therefore reduce the volume of water required to be pumped external to the reactor vessel. This not only makes it possible to reduce the number and size of external recirculation pipes but also permits reduction in the number and size of penetrations made in the reactor vessel.

As the power requirements of nuclear reactors increase, it is necessary to correspondingly increase the recirculating coolant supplied to the reactor core. This means the mass flow ratio (the ratio of the driven fluid to the driving fluid) of the jet pumps must increase to accommodate the increased demands of the reactor. However, it has been found that with an increase in mass flow ratio the flow rate of the jet pumps becomes increasingly sensitive to changes in pressure across the inlet and outlet sections of the jet pumps. These changes occur with corresponding changes in pressure across the reactor core. For purposes of control, it is desirable to maintain the jet pump flow rate at a nearly constant value irrespective of changes in pressure across its inlet and outlet sections.

To overcome this condition, it has heretofore been considered necessary to either revert to conventional exterior pumps or use single stage jet pumps driven by a non-feedwater source. Each of these approaches have disadvantages, such as, containment size, cost, and penetration of the reactor base. The problem then was one of being able to satisfy the increased flow rate requirement, provide an economic system and still use jet pumps that are relatively insensitive to pressure variations.

The first aspect of the present invention relates to the use of feedwater to drive the jet pumps positioned in the reactor core. Initially it was observed that for a given change in pressure drop across the reactor core a feedwater driven jet pump having a low mass flow ratio would result in only a small change in flow rate to the reactor core. It was then observed that by placing two feedwater driven jet pumps in series with the reactor core that an adequate flow rate was obtained and each pump had a sufficiently small mass flow ratio to be relatively insensitive to pressure variations.

After selection jet pumps having a small mass flow ratio it was discovered that the driven fluid (the recirculation water in the case of a boiling water reactor) flashed into steam at the pump inlet which resulted in a substantial reduction in efficiency. Therefore, a second aspect of the present invention consists of a technique for overcoming inlet flashing. This problem was solved by using a unique heat exchange relation between the driving feedwater of the first stage jet pump and the driven recirculating water, such that the driven recirculating water was sub-cooled a predetermined amount below its saturation temperature and thereby prevented from flashing into steam when its pressure was reduced in the pump inlet. In this manner cavitation of the jet pump was prevented which permitted optimum efficiency.

Briefly, in the feedwater jet pump system of the present invention the feedwater is split into two streams before entering the reactor pressure vessel. About one-quarter of the feedwater flow is used for recirculation water level control within the reactor. The remaining three-quarters of the feedwater flow is supplied to the jet pump assemblies of the jet pump system to pump the recirculation water through the reactor core. Each jet pump assembly comprises a first stage jet pump concentrically mounted within a heat exchanger and two second stage jet pumps respectively nested along the opposite sides of the heat exchanger. The feedwater first enters the heat exchanger where it flows in heat exchange relation with the recirculation water which is flowing to the inlet of the first stage jet pump. The heated feedwater then flows through the jet nozzle of the first stage pump and sucks in the cooled recirculation water through the inlet of the first stage pump. The mixed feedwater and recirculation water output of the first stage jet pump then split and flow into the jet nozzles of the two second stage jet pumps. This constitutes the driving fluid of the two second stage pumps which suck more recirculation water into their inlets. The second stage pumps then discharge the driving fluid and recirculation water into the supply chamber which communicates with the inlet of the reactor core.

Therefore, the first stage jet pump pumps a relatively small volume of recirculation water whereas the second stage jet pumps pump a large volume of recirculation water. Each jet pump of the example herein described has a mass flow ratio of about 2.6 and a combined mass flow ratio of about 12. This means that a pound of feedwater pumps twelve pounds of recirculation water which is sufficient for most large capacity boiling water reactors.

The subject matter which is regarded as the invention is particularly pointed out and distinctly claimed in the concluding portion of the specification. The invention, however, both as to its organization and operation, together with further objects and advantages thereof, may best be understood by reference to the following description taken in conjunction with the accompanying drawings in which:

Figure 1:
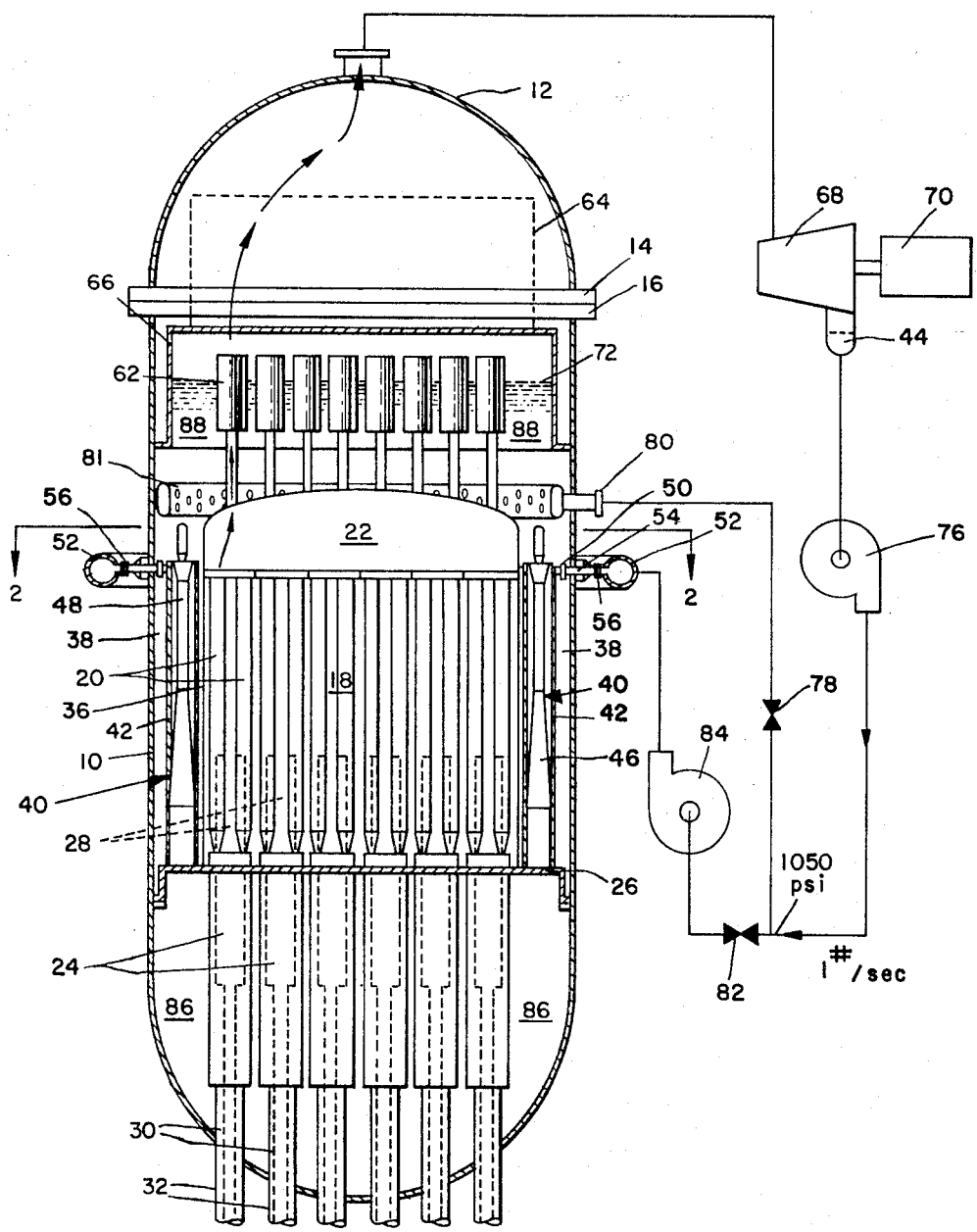
FIGURE 1 is a schematic diagram, partly in section, of a nuclear reactor employing the feedwater pump assemblies of the present invention.

In FIGURE 1 is schematically illustrated a nuclear reactor power plant in which the feedwater driven jet pumping system of the present invention is employed to recirculate the moderator-coolant in the nuclear reactor. It is to be understood that the teachings of the present invention may be used with many different power plants; however, it is being described as being used with a boiling water reactor since it has been found particularly useful with this type plant.

The reactor system depicted in FIGURE 1 includes reactor pressure vessel 10 provided with removable head 12 which is secured by means of flanges 14 and 16. Disposed within pressure vessel 10 is a nuclear chain reacting core 18 which includes a plurality of vertically mounted nuclear fuel bundles 20. Each fuel bundle consists of a plurality of longitudinally extending fuel rods (now shown) which are mounted in spaced relation and are surrounded by an open ended tubular flow channel. A top fitting is provided for each fuel bundle and is connected to the upper open end of the flow channel of the fuel bundle. A bottom fitting is connected to the lower open end of the flow channel of each fuel bundle. A plurality of longitudinally extending control rod guide tubes 24 have their upper ends supported by bottom grid plate 26. A group of four fuel bundles are associated with each control rod guide tube wherein the bottom fitting of each bundle is mounted in a socket at the upper end of the associated control rod guide tube. The upper end of each guide tube is provided with openings that communicate with supply chamber 86 and with the bottom fittings of the associated fuel bundles. The top and bottom fittings of the fuel bundles have openings therein to permit passage of fluid from supply chamber 86 through the fuel bundles to plenum 22.

Control rods 28 (shown in dotted lines) control the power level of the reactor. A separate control rod is mounted in each control rod guide tube 24 to slide longitudinally up and down between the four associated vertical fuel bundles 20 resting on the guide tube. Control rods 28 are moved into and out of the reactor core by control rod drive shafts 30 which extend through and into respective vertical control rod drive thimbles 32. These thimbles are sealed through the bottom of the vessel and are attached to the bottom ends of control rod guide tubes 24. The control rod drive shafts are operated by drive mechanisms (not shown) which control the positions of the control rods in the reactor core and thereby control the power level in the desired manner.

Figure 2:
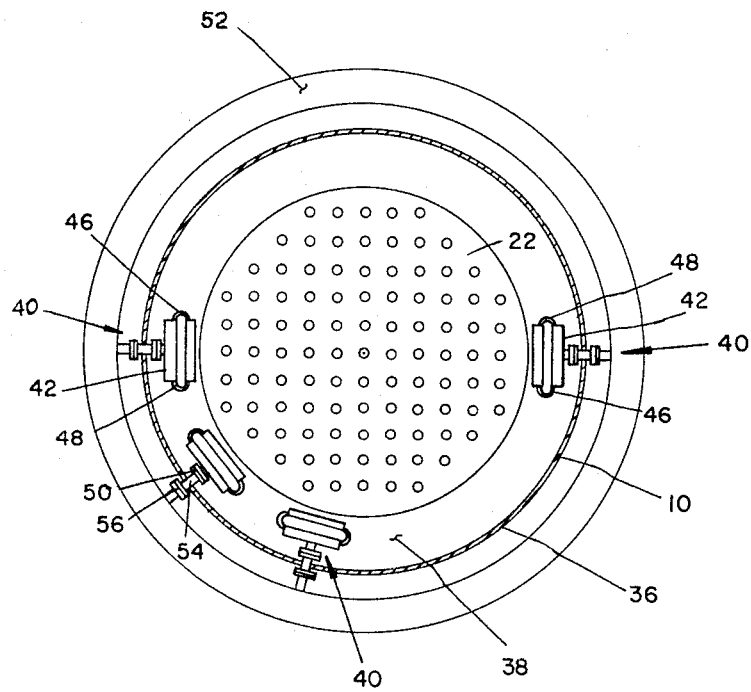
FIGURE 2 is a top elevation taken at section 2—2 of FIGURE 1 and depicts the arrangement of the pump assemblies in the nuclear reactor.

A shroud 36 is mounted coaxially within the pressure vessel to leave an upright space or downcomer annulus 38 between the shroud and the vessel wall. A plurality of upright two stage jet pump assemblies 40 are mounted in the downcomer annulus (see also FIGURE 2). Although the jet pump assemblies will be hereinafter described in detail, it should be now noted that the basic components of each jet pump assembly comprise heat exchanger 42, first stage jet pump 44 (see also FIGURES 4 and 7) and two second stage jet pumps 46 and 48. Each of the jet pump assemblies are identical and each is a separate unit. Removal is achieved by disconnecting coupling 50 and lifting the assembly from the downcomer annulus. Feedwater is supplied to annular plenum 52 which has a plurality of supply pipes 54 extending radially inwardly for supplying feedwater to the assemblies. Each of these supply pipes is connected through coupling 56 and through coupling 50 to the inlet of heat exchanger 42 of the associated jet pump assembly.

In the operation of a typical boiling water reactor a steam-water mixture is generated by core 18 which is transmitted to plenum 22. The steam-water mixture thus generated may typically have a quality of about 10%, that is, a mixture containing 10% weight of steam. The output of plenum 22 is connected to steam separators 62 which separate the steam from most of the water. The separated steam is transmitted to steam dryer 64, which is mounted on annular support member 66, which removes the remaining water and dry steam obtained therefrom is then transmitted to turbine 68 which drives electric generator 70. Water which has been separated from separators 62 and dryer 64 is returned to the water contained in vessel 10, the upper level of which is illustrated by broken line 72. Exhaust steam from turbine 68 is condensed and then collected in hotwell 44.

Steam condensate is removed from the hotwell by pump 76, the output of which is split into two different feedwater flow paths. The first feedwater flow path is through valve 78, through fittings 80 and into annular sparger 81 which circumferentially distributes the feedwater into the water contained in reactor pressure vessel 10. About one-quarter of the feedwater is transmitted to the reactor pressure vessel by this flow path at a rate that is sufficient to maintain water level 72 at a nearly constant value during all load conditions. The small required control is achieved by controlling valve 78 by means of conventional control devices which are not shown or described since they do not constitute a part of the present invention. The second feedwater flow path is through valve 82, through pump 84 and into annular plenum 52 to jet pump assemblies 40. This constitutes about three-quarters of the feed-water and serves as the driving fluid of the jet pump assemblies which function to supply the necessary recirculation water to the reactor core. Since the rate of recirculation pumping is one method of providing automatic load following on a boiling water reactor, this can be accomplished by either controlling speed on pump 84 or the position of valve 82 each of which control the rate of feedwater flow to the jet pump assemblies. The feedwater driven jet pump assemblies transfer recirculation water from upper chamber 88 to supply chamber 86 at an increased pressure. Assuming a 16 p.s.i. pressure rise by the jet pump assemblies, there will be a 16 p.s.i. pressure rise across the reactor core 18 and steam separators 62. Therefore, recirculation fluid will flow upwards from supply chamber 86, through fuel bundles 20, plenum 22, steam separators 62, to upper chamber 88 which is in open communication with downcomer annulus 38 and back into the inlet of the jet pump assemblies.

In actual practice, the water supplied from supply chamber 86 has two flow paths. The first flow path, commonly referred to as the by-pass leakage flow, consists of leaking about 10% of the total flow from supply chamber 86 through annular openings formed between the exterior surfaces at the upper ends of control rod guide tubes 24 and the associated openings in bottom grid plate 26. This water flows upwards along the exterior surface of nuclear fuel bundles 20 which maintains the control rod blades and the exterior of the fuel bundles at a temperature less than that of saturated steam under the pressure conditions involved. This by-pass leakage flow is transmitted to plenum 22, through spaces formed between the upper ends of the fuel bundles, and is mixed with the steam-water mixture emitted from the fuel bundles. The second flow path consists of transmitting the remaining 90% of the total flow from supply chamber 86 through the openings at the top of the control rods, through the lower fittings of the fuel bundles, through the flow channels of the fuel bundles, then through the upper fittings of the fuel bundles and into plenum 22. Within the flow channels, this water serves as a moderator-coolant wherein the fuel rods within the flow channels convert the water to a steam-water mixture. The quality of the steam-water mixture which results from mixing the by-pass leakage flow and the steam-water mixture from the fuel bundles is typically about 10%.

Since the steam-water mixture in plenum 22 has a quality of about 10%, only 10% by weight (dry steam) will be transmitted to turbine 68 whereas the remaining 90% is separated out as water by separators 62 and dryer 64 and returned to upper chamber 88. Therefore, the flow rate through the core is about ten times as great as the flow rate of steam to the turbine (which is the same as the feedwater flow rate). Since only about three-quarters of the feedwater is used as the driving fluid in the jet pump assemblies, the mass flow ratio of the jet pump assemblies must be of the order of twelve to one (12/1). That is, one pound of feedwater must pump about 12 pounds of recirculation water from upper chamber 88 to supply chamber 86.

The number of jet pump assemblies employed in a particular power plant will be dependent both upon the type of power plant and the amount of power which it must deliver. For purposes of illustration, the power plant which incorporates the present invention may be assumed to have the following characteristics which are typical of a fairly large capacity boiling water nuclear reactor.

*Reactor data*

| | | |
|---|---|---|
| Reactor power net | mw.(e) | 600 |
| Reactor core flow | pounds/hr | $72 \times 10^6$ |
| Plenum exit steam quality | percent | 10.3 |
| Steam flow | pounds/hr | $7.42 \times 10^6$ |
| Feedwater flow (level control) | do | $1.86 \times 10^6$ |
| Feedwater flow (pumping) | do | $5.56 \times 10^6$ |
| Reactor temperature (saturation) | °F | 545 |
| Reactor pressure | p.s.i. | 1000 |
| Core pressure drop | p.s.i. | 16 |

As previously explained, it is desirable to use jet pumps mounted within the reactor vessel to recirculate the water from upper chamber 88 to supply chamber 86. This is because it is then unnecessary to penetrate the reactor vessel with large recirculation conduits as required when using recirculating pumps exterior of the reactor. The present invention not only uses jet pumps that are inside the reactor vessel but is arranged such that only small conduits penetrate the vessel at a location far above supply chamber 86.

Figure 3:
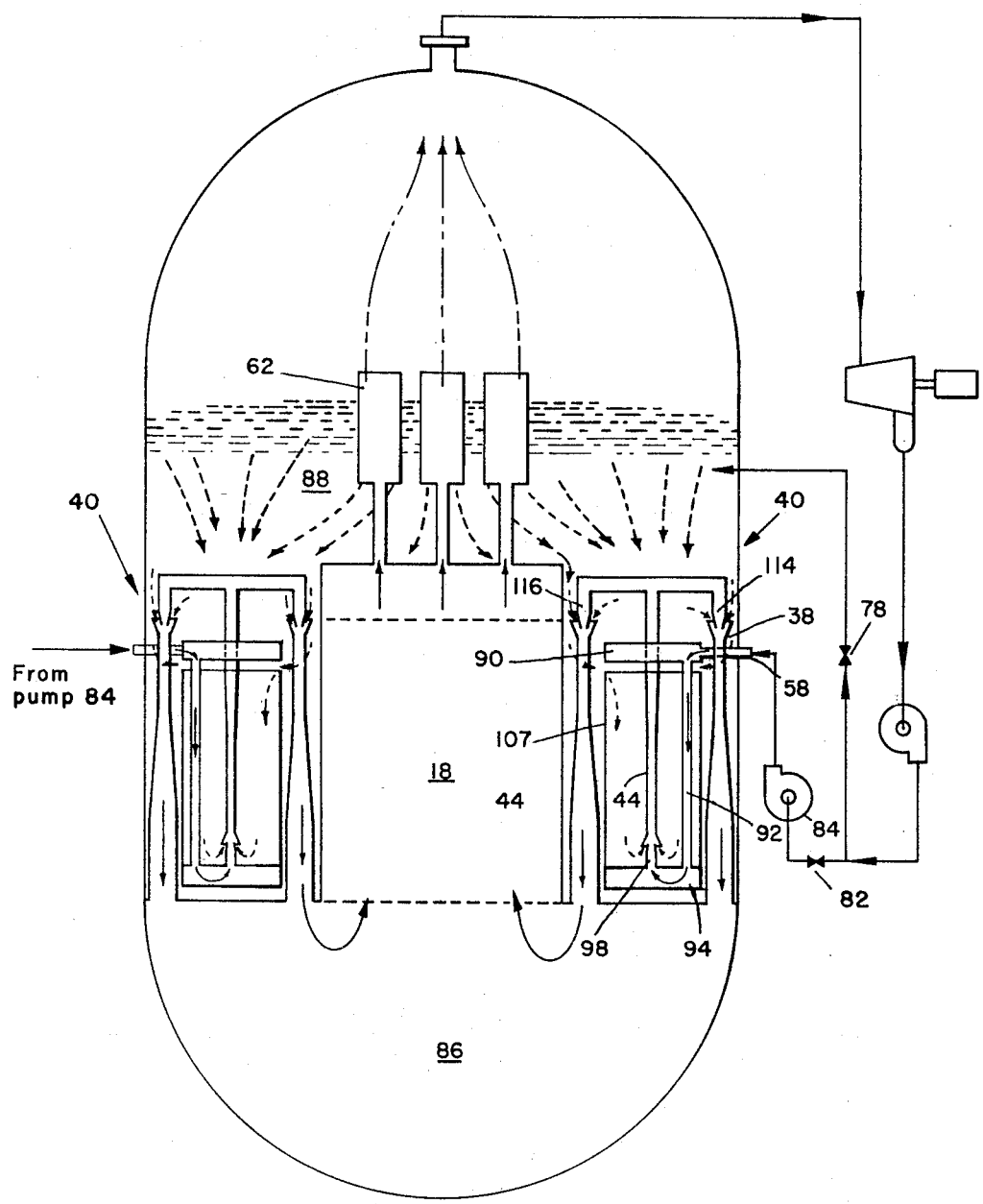
FIGURE 3 is a schematic diagram depicting the flow paths of the fluid in the reactor, jet pump assemblies, and external fluid loop in accordance with the present invention.

In FIGURE 3 is a schematic diagram depicting the flow paths of the fluid in the reactor, jet pump assemblies, and external fluid loop. As previously described, the feedwater is split into two streams before entering the pressure vessel. One-quarter of the feedwater flow is used for level control. The remaining three-quarters of the feedwater flow is raised in pressure by pump 84 and is then supplied to jet pump assemblies 40 to pump the recirculation water. This high pressure feedwater flow enters upper plenum 90 of the heat exchanger of each jet pump assembly. The feedwater then passes downward through heat exchanger tubes 92 and exhausts into lower plenum 94 of the heat exchanger. From the lower plenum the feedwater flows upwards through jet nozzle 98 of the first stage jet pump 44 which is concentrically disposed within the heat exchanger. The flow paths of the recirculation water taken directly from upper chamber 88 are indicated by the dotted arrows. The recirculation water driven by the first stage jet pump enters the heat exchanger immediately under upper plenum 90 and passes downward within enclosure 107 and in heat exchanger relation with heat exchanger tubes 92. This recirculation water is cooled by tubes 92, through which the cool feedwater is flowing, to a temperature below that which would cause detrimental cavitation when entering the inlet of the first stage jet pump. The mixed driving (feedwater) and driven (recirculation water) fluids of the first stage jet pump flow upwards and are then split and supplied to nozzles 114 and 116 of the two second stage jet pumps and constitute the driving fluid of the two second stage pumps. The two second stage jet pumps are nested on opposite sides of the heat exchanger and extend in a downward direction. The recirculation water driven by the two second stage jet pumps is taken from a region in downcomer annulus 38 that is immediately above plenum 90 and is driven downward and discharged into supply chamber 86. Water from supply chamber 86 flows upward through core 18 where it is converted to a steam-water mixture. The water from this steam-water mixture is separated by separators 62 and is returned to upper chamber 88 as indicated. The steam flows upwards as indicated by the broken lines.

The principles of operation and the basic components of the feedwater jet pump of the present invention will now be described in relation to FIGURES 4, 5 and 6. A detailed description of a specific embodiment of the feedwater jet pump will be made later in relation to FIGURES 7, 8 and 9.

Figure 4:
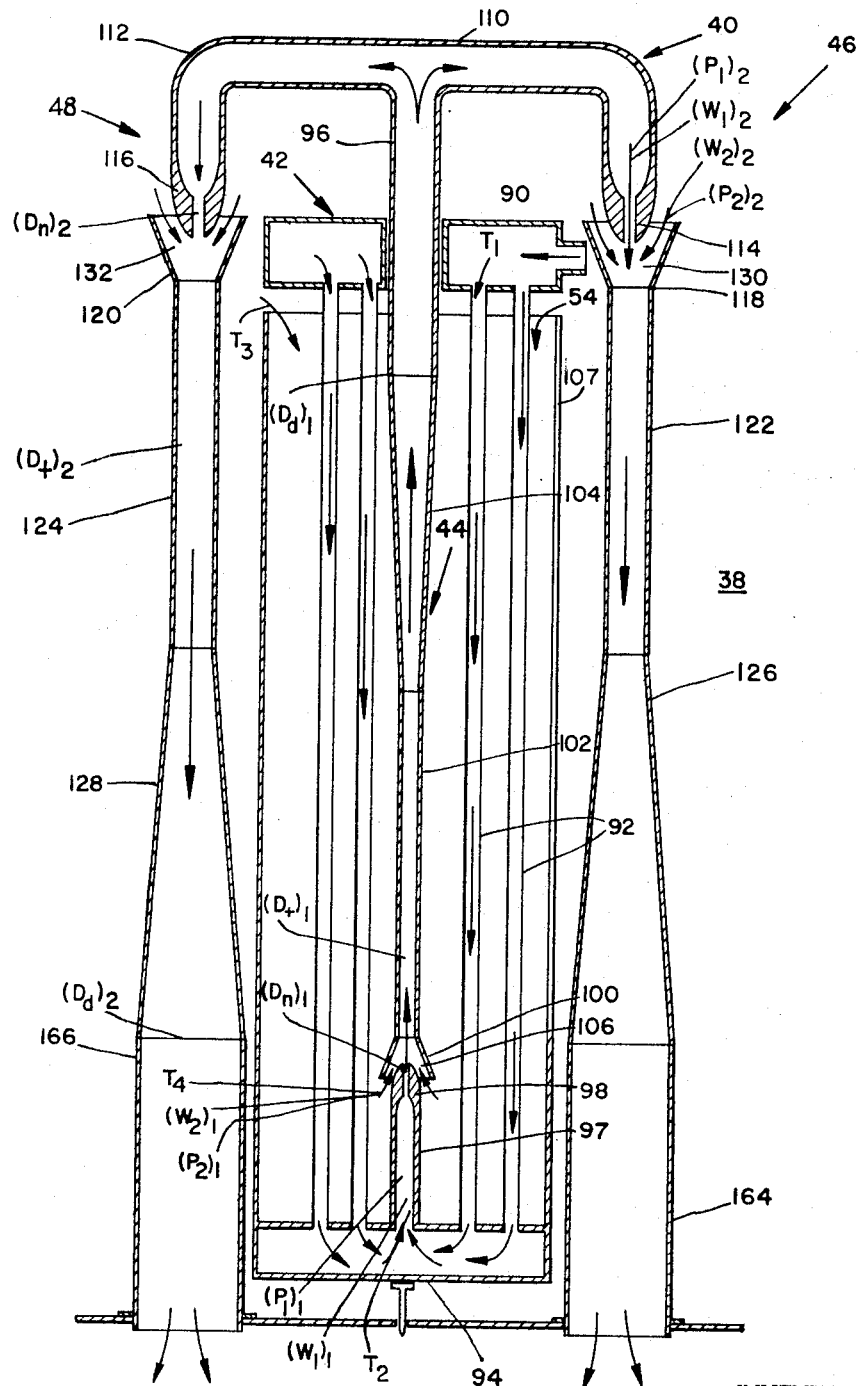
FIGURE 4 is a schematic diagram showing the jet pump assembly of the present invention and illustrates its general configuration, flow paths, and identifies its various dimensions and fluid characteristics.

Referring now to FIGURE 4, jet pump assembly 40 includes heat exchanger 42, first stage jet pump 44 and two second stage jet pumps 46 and 48. Feedwater is supplied through supply pipe 54 to upper plenum 90 of jet pump assembly 40. This feedwater then flows through a plurality of vertically extending heat exchanger tubes 92 to lower plenum 94, then through conduit 97 to jet nozzle 98 of the first stage jet pump 44. Nozzle 98 is partially inserted into converging housing 100 which merges into an elongated throat or mixing chamber 102 of substantially uniform cross-sectional area throughout its length, which merges at its downstream end into a diffuser 104 which increases in cross-sectional area in the direction of flow. The first stage jet pump inlet or suction opening 106 is formed between nozzle 98 and converging housing 100.

Diffuser 104 merges into first stage extension conduit 96 which is connected to two branch conduits 110 and 112 which are respectively connected to jet nozzles 114 and 116 of second stage jet pumps 46 and 48. Jet nozzles 114 and 116 are partially inserted into converging housings 118 and 120, respectively. These converging housings respectively merge into elongated throat or mixing chambers 122 and 124 of substantially uniform cross-sectional area throughout their lengths. The downstream ends of these mixing chambers respectively merge into diffusers 126 and 128 which increase in cross-sectional area in the direction of flow. The second stage pumps have inlet openings 130 and 132 which are convergent annular openings respectively formed between jet nozzle 114 and converging housing 118 and jet nozzle 116 and converging housing 120. Diffusers 126 and 128 respectively merge into second stage extension conduits 164 and 166. Each of these outlet conduits discharge directly into supply chamber 86 to provide the necessary recirculation water for operation of the nuclear reactor.

Preferably, the converging housings, throats, diffusers and conduits are separately made and then welded or otherwise connected to form an integral unit. The various fluid weights, pressures and temperatures and the dimensions associated with the first and second stages (both second stages being made identical) will be later considered in detail.

The basic operation of each of the jet pumps is the same so the following description will be limited to the first jet pump. Moreover, the first stage jet pump has a steam flashing problem associated at its inlet opening 106 which will also be considered in detail.

Nozzle 98 of first stage jet pump 44 is concentrically positioned in converging housing 100 to convert a low-velocity, high-pressure $(P_1)_1$ source of driving fluid $(W_1)_1$ into a high-velocity, low-pressure jet of driving fluid which flows coaxially through the inlet section and into into mixing chamber 102. The high-velocity jet of driving fluid is at a much lower pressure than the cooled recirculation fluid $(W_2)_1$ surrounding the nozzle in the vicinity of inlet opening 106 so this fluid $(W_2)_1$ is driven or sucked into the pump inlet by the jet. Converging housing 100 and the exterior surface of nozzle 98 direct the driven fluid into mixing chamber 102. Within the mixing chamber, the high-velocity jet of driving fluid gradually widens as an entrainment-mixing process takes place with the driven fluid. The mixing transfers momentum from the driving fluid to the driven fluid, so pressure of the combined stream rises. In theory, the mixing chamber ends after a uniform velocity profile is achieved, and this usually occurs shortly after the widening driving jet stream touches the mixing chamber walls. From the relatively small cross-sectional area mixing chamber, the merged driving and driven fluids flow into diffuser 104 of increasing cross section in the direction of flow, further increasing pump discharge pressure as the velocity of the merged fluid is reduced to extract the optimum amount of energy from the stream.

Enclosure 107 surrounds heat exchanger tubes 92, nozzle 98 and converging housing 100 of the first stage jep pump. The recirculating water $(W_2)_1$ which is to be driven by the first stage jet pump, enters the heat exchanger only at the upper open end of enclosure 107 since the remainder of the enclosure is sealed from the surrounding water in downcomer annulus 38. This recirculating water flows in a downwardly direction within the enclosure 107 and along the exterior surface of heat exchange tubes 92. As the recirculating water enters the heat exchanger it is at saturation temperature, which is about 545° F. for 1000 p.s.i., since these are the conditions of the water in upper chamber 88 and downcomer annulus 38 during typical reactor operation. The feedwater in heat exchanger tubes 92 flows downward and is at a higher pressure but at a lesser temperature than the recirculation water. Therefore, the recirculation water $(W_2)_1$ which is to be driven by the first stage jet pump is cooled by the feedwater $(W_1)_1$ in heat exchanger 42 as it flows downward within channel 107.

Cooling the recirculation water or driven fluid is an important facet of the present invention because if not cooled or sub-cooled (that amount cooled below saturation temperature) by heat exchanger 42, it would flash into steam in inlet opening 106 and thereby cause cavitation in the first stage pump inlet with a resultant loss in pump efficiency. To minimize flashing, it is essential to sub-cool the liquid to at least a predetermined minimum temperature for a given set of operating parameters.

Figure 5:
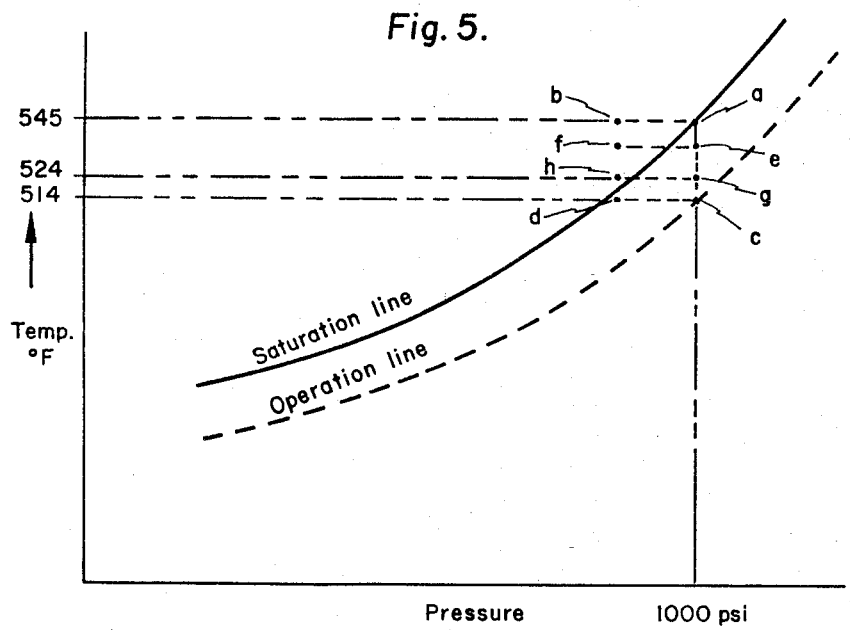
FIGURE 5 is a diagram showing the temperature and pressure characteristics of the recirculation water supplied to the inlet of the first stage pump.

The approximate degree of sub-cooling is illustrated in FIGURE 5 by the dotted line curve denoted "operating line." For a given pressure, this curve indicates the preferred temperature of the driven fluid entering the first stage jet jump. Assuming the previously discussed conditions of 1000 p.s.i. and 545° F., the driven fluid $(W_2)_1$ would be at point $a$ on the "saturation line" of FIGURE 5. If the driven fluid were not sub-cooled, then upon being sucked into the inlet opening 106 there would be a pressure drop of the driven fluid to about point $b$. Since point $b$ is in the steam region there is flashing of the driven fluid with resulting pump cavitation. By sub-cooling the driven fluid, the operating point of the driven fluid is shifter from point $a$ (1000 p.s.i., 545° F.) to point $c$ (1000 p.s.i, 514° F.). When the driven fluid is now sucked into inlet opening 106 there will be no flashing and no pump cavitation since point $d$ is below the saturation line. Sub-cooling to an intermediate point, such as $e$, would not be adequate since the driven fluid would be reduced in pressure to point $f$ which is substantially in the steam region. However, sub-cooling to point $g$ (about 524° F.) may be adequate since decreasing the pressure to point $h$, which is slightly in the steam region, may not produce sufficient flashing to cause cavitation that would be detrimental to the efficiency of the jet pump. Nevertheless, it is preferred to sub-cool the driven fluid to a temperature which will not result in flashing. It can therefore be seen that merely subcooling the driven fluid is not adequate, but rather, it is essential to sub-cool the driven fluid to a temperature where it will preferably not flash into steam at the suction entrance of the first stage jet pump.

An example of the heat exchanger design which performs the above described function under the herein described jet pump and reactor parameters is as follows:

*Heat exchanger data*

| | |
|---|---|
| Number of tubes | 72 |
| Diameter of tubes inches | 1.0 |
| Length of tubes do | 156 |
| Heat transfer area ft.$^2$ | 245 |
| Heat flux B.t.u./hr./ft.$^2$ | 147,000 |
| Feedwater inlet temperature ($T_1$) ° F. | 300 |
| Feedwater outlet temperature ($T_2$) ° F. | 398 |
| Recirculating water $(W_2)_1$ inlet temperature ($T_3$) ° F. | 545 |
| Recirculating water $(W_2)_1$ outlet temperature ($T_4$) ° F. | 514 |
| Over-all heat transfer coefficient B.t.u./hr./ft.$^2$—° F | 1000 |

Another important feature of the present invention pertains to the careful selection of mass flow ratios for the first stage jet pump and combined second stage jet pumps. One of the characteristics of a single stage feedwater jet pump system relates to its flow rate sensitivity to changes in pressure. To achieve adequate recirculation in a reasonably large capacity reactor during normal operation it is necessary for a single stage jet pump to have a mass flow ratio in the range of 8 to 13, for example. However, with a mass flow ratio in this range, a small change in pressure drop across the reactor core results in a relatively large change in flow rate through the jet pump. While these variations may be adequately accommodated by existing control systems, it is, nevertheless, desirable to minimize flow variations since this provides smoother control and less hunting by the control system.

One of the primary purposes of the present invention is to provide a jet pump system having a low mass flow ratio and sufficient recirculation flow to meet the requirements of fairly large reactors. The present jet pump system employs a mass flow ratio of about 2.6 which renders it relatively insensitive to variations in pressure drop across the reactor core. Moreover, it can also provide a flow rate of $72 \times 10^6$ pounds/hr. which is sufficient to operate a reactor having the previously assumed operating parameters. The following discussion and analysis is presented to illustrate how it was discovered that these high flow rates and low mass flow ratios could be simultaneously achieved.

The jet pump system equivalent mass flow ratio may be defined by the relation:

(1) $M_E$=driven fluid/driving fluid where $M_E$ is the equivalent or over-all mass flow ratio of the jet pump system, "driven fluid" is the fluid being driven by the jet pump system, "driving fluid" is the fluid driving the driven fluid in the jet pump system.

The equivalent mass flow ratio ($M_E$) of the present invention may also be defined in terms of feedwater and recirculation water supplied directly to the jet pump assemblies as follows:

(2) $$M_E \frac{(W_2)_1+(W_2)_2}{(W_1)_1} = M_1 + \frac{(W_2)_2}{(W_1)_1}$$

where $(W_1)_1$ is the flow rate of the "driving fluid" (or feedwater) supplied to the first stage pump, $(W_2)_1$ and $(W_2)_2$ are respectively the flow rates of the "driven fluid" (or recirculation water) of the first and second stage pumps, and $M_1$ is the mass flow rates of the first stage jet pump.

The second stage pump mass flow ratio $M_2$ may be defined as:

(3) $$M_2 = \frac{(W_2)_2}{(W_1)_2}$$

where $(W_1)_2$ is the "driving fluid" of the second stage jet pump.

Since $(W_1)_2 = [(W_2)_1 + (W_1)_1]$ then $(W_2)_2$ may be defined as:

(4) $(W_2)_2 = M_2(W_1)_2 = M_2[(W_2)_1 + (W_1)_1]$

Dividing both sides of Equation 4 by $(W_1)_1$ it becomes:

(5) $$\frac{(W_2)_2}{(W_1)_1} = M_2\left[\frac{(W_2)_1 + (W_1)_1}{(W_1)_1}\right] = M_2(M_1+1)$$

Combining Equation 2 and 5 results in:

(6) $M_E = (M_1+1)M_2 + M_1$ where $M_1$ and $M_2$ are respectively the mass flow ratios of the first and second stage jet pumps.

It has been discovered that the second stage pump is the most critical pump to maintain at a low mass flow ratio since the pressure drop across the core will materially effect its operation. This is because a change in reactor pressure drop will result in a corresponding change in pressure drop across the second stage jet pumps. That is, a change in reactor pressure drop will result in corresponding changes in pressures $(P_2)_2$ and $(Pd)_2$ respectively of downcomer annulus 38 and supply chamber 86. The first stage pump is effected to a lesser degree since it discharges into nozzles 114 and 116 of the second stage jet pumps wherein the pressure $(P_1)_2$ of these nozzles is relatively independent from the pressure $(P_2)_2$ of downcomer annulus 38. Excellent characteristics have been discovered by setting the mass flow ratios of the two pumps at equal values (i.e., $M_1=M_2=M$). However, it is to be understood that the mass flow ratios of the two pumps may be selected to have different values provided the pumps perform in accordance with the herein described objectives.

With equal values, Equation 6 becomes:

(7) $M_E = M^2 + 2M$

The equivalent mass flow ratio may also be defined in terms of mass flow ratio of the power plant, as a system, as follows:

(8) $$M_E = \frac{W_T - (X)W_T \text{ (percent } FW)}{(X)W_T \text{ (percent } FW)} = \frac{W_T - (.103)W_T)W_T(.75)}{.103W_T(.75)} = 11.99$$

where $W_T$ is the total mass flow rate through the core, $X$ is the steam quality and percent $FW$ is that part of the feedwater transmitted to the jet pump system.

Now, by setting Equations 7 and 8 equal to each other, the mass flow ratio of the first and second stage jet pumps are found to be 2.6 each. The advantages of this discovery will now be described with relation to FIGURE 6 which is a set of curves illustrating the effect on the flow rates of high and low mass flow ratio jet pumps with changes in pressure across the reactor core. In this figure the abscissa represents reactor core flow rate (which is about equal to the flow rate in the second stage jet pumps), the ordinate represents the reactor pressure drop which occurs across the reactor core, plenum and steam separators (which is about equal to the pressure drop $[(Pd)_2-(P_2)_2]$ across the second stage jet pumps), and the plotted curves represent mass flow ratios of 2.6 and 10, as indicated.

Figure 6:
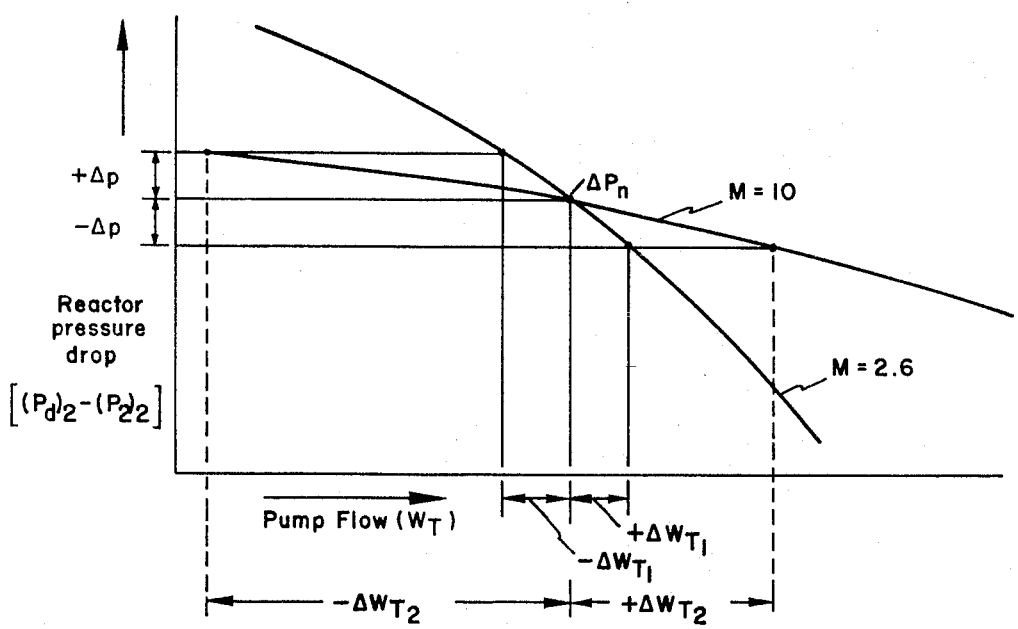
FIGURE 6 is a diagram showing the jet pump flow rate as a function of pressure drop across the jet pump for jet pumps having mass flow ratio of 2.6 and 10.

Assume the normal operating reactor pressure drop is 16 p.s.i. as indicated by $\Delta p$ (normal pressure drop) which, for purpose of illustration, is taken at the crossover points of the two curves of FIGURE 6. Assume also that there is a perturbation in the reactor which results in an increase in pressure drop of 3 p.s.i., for example, across the reactor as indicated by $+\Delta p$. Under this set of conditions and with a jet pump having a mass flow ratio of 2.6, there will be a negative change in flow rate as indicated by the symbol $(-\Delta W_{T_1})$. With a jet pump system having a mass flow ratio of 10 there will be a negative change in flow rate as indicated by the symbol $(-\Delta w_{T_2})$. The equivalent situation occurs when there is a perturbation in the reactor core which causes a decrease in pressure drop $(-\Delta p)$ across the reactor which results in change in flow rates of $(+\Delta W_{T_2})$ and $(+\Delta W_{T_1})$ for jet pumps having mass flow ratios of $M=10$ and $M=2.6$, respectively. It can be therefore seen that for a given change in reactor pressure drop that the change in flow rate of a jet pump having a large mass flow ratio ($M=10$) is much greater than for a jet pump having a small mass flow ratio ($M=2.6$). That is, $$(\Delta W_{T_2}) \gg (\Delta W_{T_1})$$

for a given $(\Delta p)$.

Figure 7:
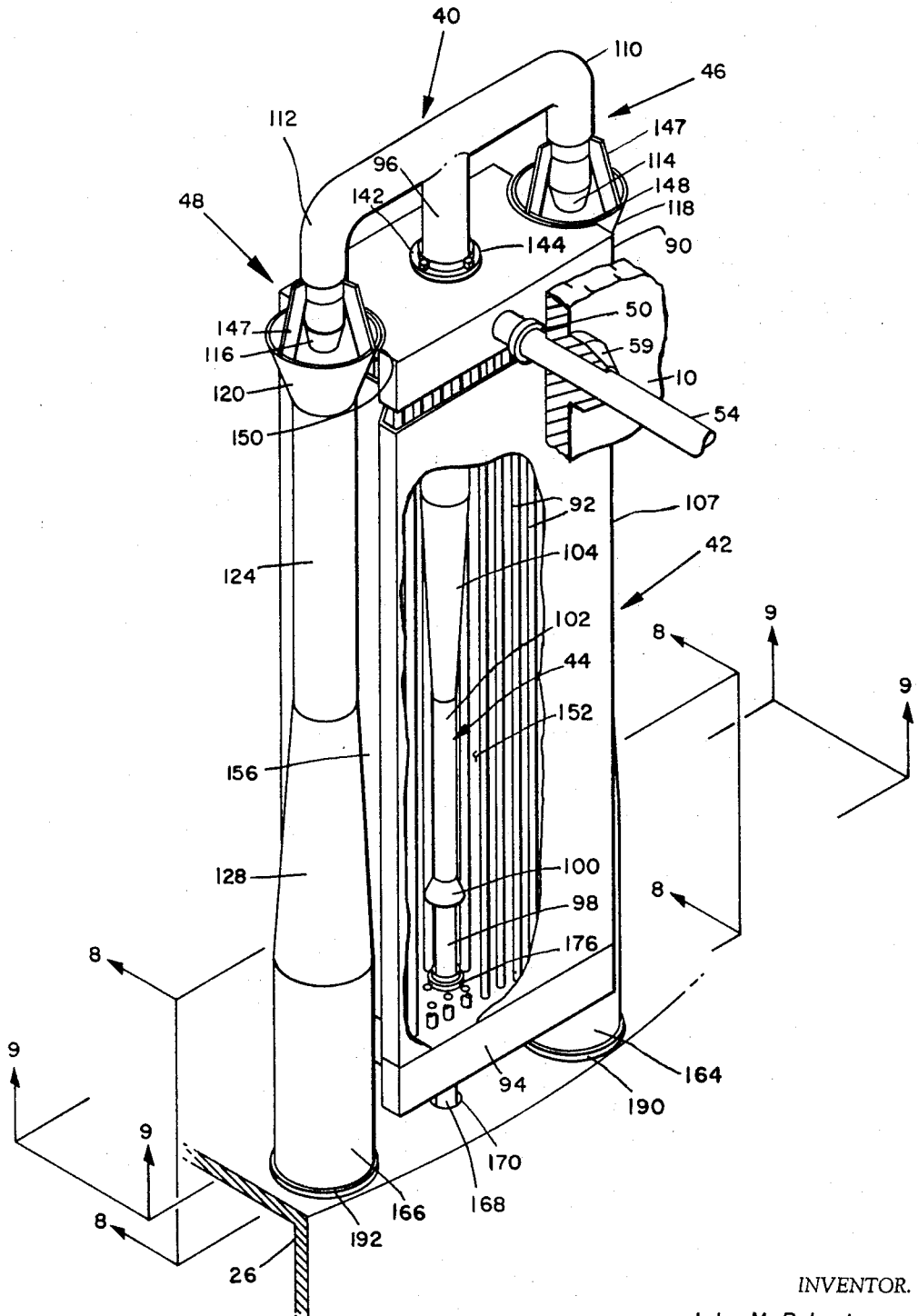
FIGURE 7 is a isometric view, partly in section, showing the details of the jet pump assembly of the present invention.
Figure 9:
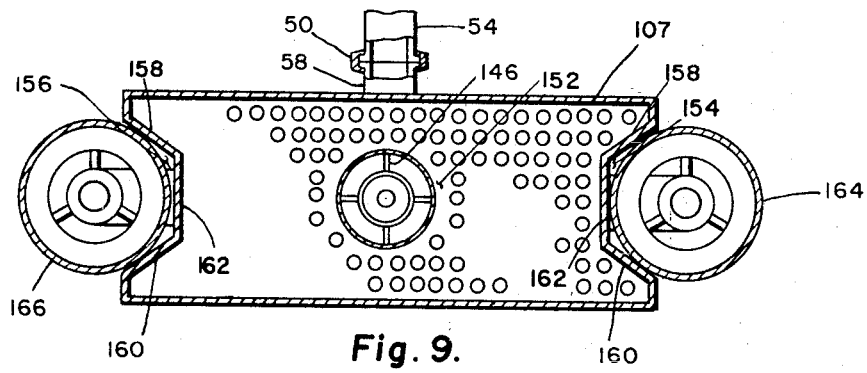
FIGURE 9 is a bottom elevation taken at section 9—9 of FIGURE 7.
Figure 8A:
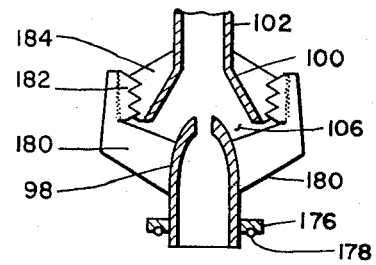
FIGURE 8A is a sectional view of an alternative arrangement of the first stage jet pump nozzle and mounting elements.
Figure 8:
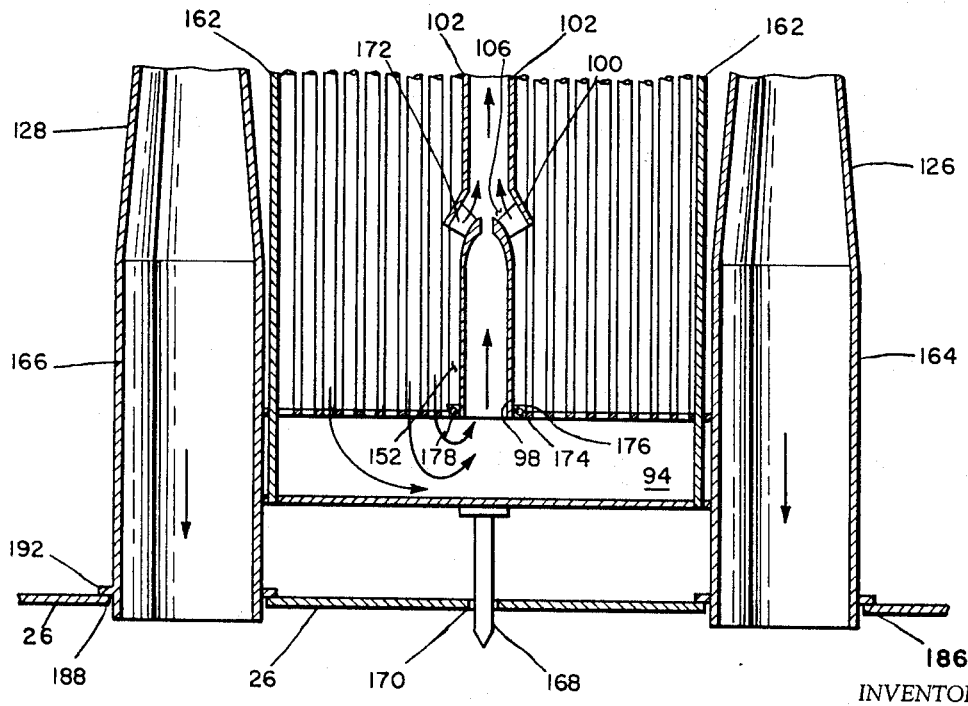
FIGURE 8 is a partial side elevation taken at section 8—8 of FIGURE 7.

In FIGURES 7, 8 and 9 is illustrated the preferred embodiment of the feedwater jet pump assembly of the present invention. The basic elements of the feedwater jet pump assembly 40 were previously generally described and included heat exchanger 42, first stage jet pump 44 and two second stage jet pumps 46 and 48. More specifically, from FIGURE 7 it can be seen that first stage jet pump 44 is concentrically mounted within heat exchanger 42 and the two second stage jet pumps 46 and 48 are respectively nested along the opposite sides of the heat exchanger wherein the longitudinal axis of the first stage and two second stage jet pumps are parallel and occupy the same plane. As previously stated, fluid flows downwards through the heat exchanger (both inside and outside the heat exchanger tubes), upwards through the first stage jet pump, and downwards through both the second stage jet pumps.

Heat exchanger 42 includes upper plenum 90, heat exchanger tubes 92, lower plenum 94, and enclosure 107. The upper and lower feedwater plenums are interconnected by longitudinally extending spaced apart feedwater tubes 92 which are sealed at their ends to prevent leakage of feedwater into the recirculation water. Feedwater is supplied to upper plenum 90 through supply pipe 54 and coupling 50. Supply pipe 54 penetrates reactor pressure vessel 10 and is sealed by means of fitting 59. Coupling 50 is preferably of the "Marman" type; however, any coupling which can be readily connected and disconnected for removal of the jet pump assembly will suffice. The upper plenum is provided with a sealed cylindrical passage having a sufficiently large diameter to permit passage of extension conduit 96 and removal and insertion of first stage jet pump 44. A collar 142 is connected to extension conduit 96 by welding or the like and may be attached to the upper surface of upper plenum 40 by bolts 144 or the like. With bolts 144 removed, nozzles 114 and 116 of the two second stage jet pumps and most or all (see FIGURES 8 and 8A) of the first stage jet pump may be inserted or removed as a unit. The opposite sides of upper plenum 90 have cylindrical shaped indentations 148 and 150 for respectively receiving converging housings 118 and 120 of the two second stage jet pumps.

The heat exchanger tubes 92 are arranged to form a longitudinally extending generally cylindrical cavity 152. The diameter of cavity 152 is selected to be sufficiently large for easy removal and insertion of first stage jet pump 42 which is contained therein. Enclosure 107 is longitudinally extending and includes channels 154 and 156 extending its entire length for respectively receiving the two second stage jet pumps 46 and 48. Each of these channels have flat sloping side sections 158 and 160 which merge into a flat bottom section 162. Many different configurations could be used to form these channels; however, the above-described configuration is preferred over a cylindrical shape since it is more easily manufactured. The arrangement of heat exchanger tubes within enclosure 107 is dependent upon their size and number which depend upon the particular pump and power plant requirements. However, in the specific arrangement of FIGURE 7 it is necessary that the heat exchanger tubes form a cavity 152 for receiving the first stage jet pump and have a peripheral configuration that generally conforms to that of enclosure 107. Bottom feedwater plenum 94 has side indentations (not shown), similar to side indentations 148 and 150 of upper feedwater plenum 90, for receiving extensions 164 and 166 of the two second stage jet pumps. To provide proper alignment and prevent lateral movement of the heat exchanger, centering pin 168 is connected to the bottom of plenum 94 and is inserted into opening 170 which is formed in bottom grid plate 26. Due to the cold running temperature of the heat exchanger 42 relative to pressure vessel 10 there will be vertical movement of pin 168 in hole 170. The heat exchanger assembly is supported at the top by supply pipe 54.

Two different supporting arrangements for nozzle 98 of the first stage jet pump are respectively illustrated in FIGURE 8 and in FIGURE 8A. In the FIGURE 8 arrangement, four radially spaced apart fins 172 are connected to the interior surface of converging housing 100 by welding or the like and rest against the exterior surface of nozzle 98. Fins 172 are made of a thin material and are preferably designed to offer the least possible resistance to the flow of liquid in the first stage pump inlet 106. The lower end of nozzle 98 of the first stage jet pump is inserted into opening 174 which is formed in the upper side of lower plenum 94. Collar 176 is attached by welding or the like to the lower end of nozzle 98 to provide vertical support. It will be appreciated that opening 174 and the lower end of nozzle 98 may be threaded to provide rigid interconnection. In addition, a seal, such as a metal O-ring 178 may be provided to prevent the feedwater in plenum 94 from leaking into cylindrical cavity 152. The removal or insertion of nozzle 98 may require the use of a special tool which will reach down into cavity 152 and turn and/or lift the nozzle as the case may be. It may be also desirable to shape the exterior surface of the nozzle to accommodate the particular tool.

In FIGURE 8A is illustrated an alternative design wherein nozzle 98 is directly attached by four radially spaced apart fins 180 to converging housing 100. With this arrangement nozzle 98 is lifted out with the upper elements of the first stage pump. The lower ends of fins 180 are connected by welding or the like to the exterior surface of nozzle 98 and the upper ends are connected to support ring 182. Support ring 182 has internal threads that co-act with the external threads of annular collar 184 which is connected to either converging housing 100 or mixing chamber 102 or both by conventional techniques. Fins 180 are preferably made of thin material and are streamlined to minimize the resistance to fluid flowing into opening 106. It will be appreciated that varying spacings and numbers of fins may be employed to accommodate particular needs.

In both the FIGURE 8 and FIGURE 8A configurations, the upper end of nozzle 98 is partially inserted into converging housing 100 which merges into an elongated mixing chamber 102 of substantially uniform cross-sectional area throughout its length, which merges at its downstream end into a diffuser 104 which increases in cross-sectional area in the direction of flow. The first stage jet pump inlet opening 106 is formed between the upper end of nozzle 98 and converging housing 100. Diffuser 104 merges into passage 140 which is connected to two branch conduits 110 and 112 that are curved to turn the fluid 180 degrees and provide minimum resistance to fluid flow. Branch conduits 110 and 112 carry equal amounts of fluid and their ends respectively merge into jet nozzles 114 and 116 of second stage jet pumps 46 and 48. Jet nozzles 114 and 116 are respectively partially inserted into converging housings 118 and 120, which are nested in indentations 148 and 150 of upper plenum 90. Jet nozzles 114 and 116 are respectively connected to housings 118 and 120 by means of fins 147. The two second stage jet pumps have inlet openings formed between jet nozzle 114 and converging housing 118 and jet nozzle 116 and converging housing 120. Converging housings 118 and 120 of the two second stage jet pumps respectively merge into elongated mixing chambers 122 and 124 of substantially uniform cross-sectional area throughout their lengths. The downstream ends of these mixing chambers respectively merge into diffusers 126 and 128 which increase in cross-sectional area in the direction of flow. The downstream ends of diffusers 126 and 128 respectively merge into extension conduits 164 and 166. The lower ends of conduits 164 and 166 are inserted through openings 186 and 188 of lower grid 26. Collars 190 and 192 are respectively connected by welding or the like near the ends of extension conduits 164 and 166 and rest against the upper surface of lower grid 26 to support the second stage pumps.

Two second stage pumps are employed in place of a single second stage pump to decrease the over-all length and width (as viewed in FIGURE 1) of the pump assembly so that it will fit within a minimum size downcomer annulus 38. This is an important feature of the present invention since increase in size of reactor pressure vessel 10, which would be necessary if the size of the downcomer annulus were increased, is very expensive.

The requirements upon the heat exchanger establish the length and number of heat exchanger tubes necessary to provide adequate cooling. Extension 96 of the first stage pump and extensions 164 and 166 of the second stage pumps have lengths which are necessary to achieve the required connections. However, these extensions also serve to smooth the flow within the jet pumps which improves their performance characteristics. It should be noted that a single second stage pump would be longer than the heat exchanger and would therefore require an increase in pressure vessel size.

The specific dimensions and characteristics of the jet pumps of the present invention for use with the above-described reactor and heat exchanger are as follows:

*Jet pump data*

| | 1st Stage | 2d Stage (2 pumps) |
|---|---|---|
| No. of pumps | 16 | 32. |
| Mass flow ratio | 2.6 ($M_1$) | 2.6 ($M_2$). |
| Nozzle diameter | .817″ ($D_n$)$_1$ | 2.18″ ($D_n$)$_2$. |
| Throat diameter | 2.31″ ($D_t$)$_1$ | 6ll.5″ ($D_t$)$_2$. |
| Diffuser diameter | 5″ ($D_d$)$_1$ | 12″ ($D_d$)$_2$. |
| Throat length | 18.5 | 49.0 |
| Diffuser length | 21.0 | 55.5 |
| Nozzle pressure | 2,241 p.s.i. ($P_1$)$_1$ | 1,141 p.s.i. ($P_1$)$_2$. |
| Pressure ratio | .128 ($N_1$) | .128 ($N_2$). |
| Jet pump efficiency | 33% | 33%. |
| Primary flow | 97 pounds/sec. ($W_1$)$_1$ | 173.5 pounds/sec. ($W_1$)$_2$. |
| Secondary flow | 250 pounds/sec. ($W_2$)$_1$ | 452 pounds/sec. ($W_2$)$_2$. |

It will be appreciated by those skilled in the art that the jet pump assembly of the present invention and the components thereof may be modified or changed to accommodate particular needs. For example, it may be desirable to provide a jet pump assembly for supplying recirculating water to a reactor of greater or lesser capacity than that described. To accommodate a greater capacity reactor or provide increased flow rate would necessitate an increase in size or number of the jet pump assemblies or their component parts or both. In addition, the shapes and dimensions may be changed to accommodate particular needs. As noted above, two second stage pumps are employed to decrease the over-all length and width of the pump assembly. However, in certain situations it may be desirable to employ only one second stage pump or three or more second stage pumps as the case may be.

The particular embodiments of this invention have been described in detail and it should be understood that various other modifications thereof may be made by those skilled in this particular art without departing from the spirit and scope of this invention as set forth in the following claims.

I claim:

1. A jet pump assembly comprising a first stage jet pump connected in series with at least one second stage jet pump, a heat exchanger, driving fluid at a first temperature passing through said heat exchanger in heat exchange relation with driven fluid at a second temperature, said second temperature being greater than said first temperature, means for transmitting said driving fluid discharged from said heat exchanger to the nozzle of said first stage jet pump, means for transmitting said driven fluid discharged from said heat exchanger to the inlet of said first stage jet pump.

2. A pump assembly comprising: at least one jet pump having a nozzle for receiving driving fluid and an inlet for receiving driven fluid; a heat exchanger; means for transmitting driving fluid through said heat exchanger in heat exchange relation with driven fluid; means for directing the driving fluid discharged from said heat exchanger to the nozzle of said jet pump; and means for directing the driven fluid discharged from said heat exchanger to the inlet of said jet pump.

3. The combination defined by claim 2 wherein upon entry to said heat exchanger the driving fluid is at a lower temperature than the driven fluid.

4. Apparatus for circulating a coolant fluid through a heat source, comprising: at least one jet pump having, an inlet, a nozzle and an outlet; a heat exchanger; a source of pressurized driving fluid; means for directing said driving fluid through said heat exchanger to said nozzle; means for directing said coolant fluid through said heat exchanger to said pump inlet for decreasing the temperature difference between said coolant fluid and said driving fluid at said pump inlet; and means for directing fluid from said pump outlet through said heat source.

References Cited
UNITED STATES PATENTS

| | | | |
|---|---|---|---|
| 1,359,907 | 11/1920 | Morison | 230—102 |
| 1,447,014 | 2/1923 | Ehrhart | 230—102 |
| 1,504,723 | 8/1924 | Schmidt | 103—267 |
| 1,521,729 | 1/1925 | Suczek | 230—102 |
| 1,546,641 | 7/1925 | Fothergill | 230—102 |
| 1,569,760 | 1/1926 | Leblanc | 230—102 |
| 1,796,056 | 3/1931 | Sim | 165—112 |
| 2,436,693 | 2/1948 | Hickman | 165—112 |
| 2,886,236 | 5/1959 | Warmoltz et al. | 230—102 |
| 3,154,140 | 10/1964 | Esselman et al. | 103—266 |

FRED C. MATTERN, JR., *Primary Examiner.*

ROBERT M. WALKER, *Examiner.*

W. J. KRAUSS, *Assistant Examiner.*

UNITED STATES PATENT OFFICE
CERTIFICATE OF CORRECTION

Patent No. 3,380,649  
April 30, 1968

John Martin Roberts

It is certified that error appears in the above identified patent and that said Letters Patent are hereby corrected as shown below:

Column 2, line 30, "After selection" should read -- After selecting --. Column 7, line 26, after "first", first occurrence, insert -- stage --; line 57, "jep" should read -- jet --. Column 8, line 23, "shifter" should read -- shifted --. Column 9, lines 28 to 30, in the equation, after "$M_E$" insert -- = --; lines 40 to 43, in the equation "$(W_1)_1$" should read -- $(W_1)_2$ --; line 46, after "$(W_1)_1$" insert -- ] --. Column 10, lines 16 and 17, in the equation "$W_T-(.103)\ \bar{W}_T)W_T(.75)$" should read -- $W_T-(.103)W_T(.75)$ --. Column 13, in the table, third column, line 4 thereof, "6115" should read -- 6.15 --.

Signed and sealed this 7th day of April 1970.

(SEAL)  
Attest:

Edward M. Fletcher, Jr.  
Attesting Officer

WILLIAM E. SCHUYLER, JR.  
Commissioner of Patents